United States Patent
Das et al.

(10) Patent No.: US 11,492,474 B2
(45) Date of Patent: Nov. 8, 2022

(54) SLIT FILM TAPE COMPOSITIONS

(71) Applicant: ExxonMobil Chemical Patents Inc., Baytown, TX (US)

(72) Inventors: Kaushik Das, Karnataka (IN); Nilesh C. Shah, Karnataka (IN); Saifudin M. Abubakar, Shanghai (CN); Saurabh C. Sharma, Karnataka (IN); Virendra K. Tiwari, Karnataka (IN)

(73) Assignee: EXXONMOBIL CHEMICALS PATENTS INC., Baytown, TX (US)

( * ) Notice: Subject to any disclaimer, the term of this patent is extended or adjusted under 35 U.S.C. 154(b) by 219 days.

(21) Appl. No.: 16/682,234

(22) Filed: Nov. 13, 2019

(65) Prior Publication Data
US 2020/0207962 A1 Jul. 2, 2020

Related U.S. Application Data

(60) Provisional application No. 62/785,258, filed on Dec. 27, 2018.

(51) Int. Cl.
| | | |
|---|---|---|
| *C08L 23/12* | (2006.01) | |
| *C08J 5/18* | (2006.01) | |
| *B29C 48/00* | (2019.01) | |
| *B29K 23/00* | (2006.01) | |
| *B29L 7/00* | (2006.01) | |

(52) U.S. Cl.
CPC ............... *C08L 23/12* (2013.01); *C08J 5/18* (2013.01); *B29C 48/0018* (2019.02); *B29C 48/0022* (2019.02); *B29C 2793/0036* (2013.01); *B29K 2023/12* (2013.01); *B29L 2007/007* (2013.01); *C08J 2323/12* (2013.01); *C08J 2423/06* (2013.01); *C08J 2423/12* (2013.01); *C08L 2201/08* (2013.01); *C08L 2203/16* (2013.01); *C08L 2205/025* (2013.01); *C08L 2205/03* (2013.01); *C08L 2310/00* (2013.01)

(58) Field of Classification Search
CPC ........ C08L 23/12; C08L 23/14; C08L 23/142; C08L 23/16; C08L 2205/025; C08L 2203/16; C08L 2310/00; C08K 3/013; C08K 3/014; C08K 2003/265
See application file for complete search history.

(56) References Cited

U.S. PATENT DOCUMENTS

| | | | | |
|---|---|---|---|---|
| 5,045,598 | A * | 9/1991 | Duez ................. | D01D 5/42 524/505 |
| 6,881,793 | B2 * | 4/2005 | Sheldon ............. | C09J 7/243 525/240 |
| 8,252,861 | B2 * | 8/2012 | Leysen .............. | C08L 23/10 524/425 |
| 9,062,169 | B2 * | 6/2015 | Gusain .............. | D01D 5/426 |
| 9,434,827 | B2 * | 9/2016 | Frei .................. | C08L 23/16 |
| 9,464,181 | B2 * | 10/2016 | Tong ................. | C08K 3/26 |
| 10,563,055 | B2 * | 2/2020 | Gong ................ | B32B 25/02 |
| 10,808,112 | B2 * | 10/2020 | Ni .................... | C08L 23/142 |
| 2006/0247332 | A1 | 11/2006 | Coffey et al. | |
| 2009/0029098 | A1 * | 1/2009 | Ashbaugh .......... | C08J 5/18 524/451 |
| 2011/0268929 | A1 * | 11/2011 | Tran ................. | B32B 27/30 428/189 |
| 2013/0202902 | A1 * | 8/2013 | DeJesus ............ | C09J 123/20 428/494 |

FOREIGN PATENT DOCUMENTS

WO     2006/065648 A     6/2006

* cited by examiner

*Primary Examiner* — Rip A Lee
(74) *Attorney, Agent, or Firm* — Katherine L. Jackson

(57) ABSTRACT

In an embodiment, a slit film tape composition includes a propylene-based elastomer comprising 1-16 wt % ethylene based on a total weight of the propylene-based elastomer, the propylene-based elastomer having a melt flow rate (MFR) of 1-50 g/10 min; a polypropylene comprising 10-100 mol % propylene based on a total weight of the polypropylene, the polypropylene having a MFR of 2-35 g/10 min; and a filler. In another embodiment, a slit film tape composition includes a propylene-based elastomer comprising from 5-30 wt % ethylene based on a total weight of the propylene-based elastomer, the propylene-based elastomer having a MFR of 35-60 g/10 min; a polypropylene comprising 10-100 mol % propylene based on a total weight of the polypropylene, the polypropylene having a MFR of 2-35 g/10 min; and a filler.

34 Claims, No Drawings

SLIT FILM TAPE COMPOSITIONS

CROSS-REFERENCE TO RELATED APPLICATIONS

This application claims priority to U.S. Ser. No. 62/785,258, filed Dec. 27, 2018, herein incorporated by reference.

FIELD

This disclosure generally relates to slit film tape compositions.

BACKGROUND

Conventional polypropylene slit film tapes are made from filler masterbatch compositions containing polypropylene homopolymer and $CaCO_3$. Filler masterbatch, which contains a large percentage of $CaCO_3$, is added to these compositions to reduce cost. However, as the amount of filler masterbatch increases in the slit film tapes, the slit film tapes lose strength and flexibility. As a consequence, one difficulty encountered during the production of, e.g., bags from slit film tapes, is frequent tape breaking in tape lines and looms. This leads to frequent down times and increased manufacturing costs. Finished bags based on conventional slit film tapes also suffer from ultraviolet (UV) light-based degradation with increasing amounts of $CaCO_3$.

There is a need for slit film tapes having increased tenacity (tensile strength divided by denier), higher elongation, and less tape breakage with higher fill loading. There is also a need to achieve better UV resistance of the slit film tapes.

SUMMARY

In an embodiment, a slit film tape composition is provided. The slit film composition includes a propylene-based elastomer comprising from 1 wt % to 16 wt % ethylene based on a total weight of the propylene-based elastomer, the propylene-based elastomer having a melt flow rate (ASTM D1238, 230° C., 2.16 kg) of from 1 g/10 min to 50 g/10 min; a polypropylene comprising from 10 mol % to 100 mol % propylene based on a total weight of the polypropylene, the polypropylene having a melt flow rate (ASTM D1238, 230° C., 2.16 kg) of from 2 g/10 min to 35 g/10 min; and a filler.

In an embodiment, a slit film tape composition is provided. The slit film composition includes a propylene-based elastomer comprising from 1 wt % to 4 wt % ethylene based on a total weight of the propylene-based elastomer, the propylene-based elastomer having a melt flow rate (ASTM D1238, 230° C., 2.16 kg) of from 1 g/10 min to 35 g/10 min; a polypropylene comprising from 10 mol % to 100 mol % propylene based on a total weight of the polypropylene, the polypropylene having a melt flow rate (ASTM D1238, 230° C., 2.16 kg) of from 2 g/10 min to 35 g/10 min; and a filler.

In another embodiment, a slit film tape composition is provided. The slit film composition includes a propylene-based elastomer comprising from 5 wt % to 30 wt % ethylene based on a total weight of the propylene-based elastomer, the propylene-based elastomer having a melt flow rate (ASTM D1238, 230° C., 2.16 kg) of from 35 g/10 min to 60 g/10 min; a polypropylene comprising from 10 mol % to 100 mol % propylene based on a total weight of the polypropylene, the polypropylene having a melt flow rate (ASTM D1238, 230° C., 2.16 kg) of from 2 g/10 min to 35 g/10 min; and a filler.

In another embodiment, a slit film tape composition is provided. The slit film composition includes a propylene-based elastomer comprising from 1 wt % to 30 wt % ethylene based on a total weight of the propylene-based elastomer, the propylene-based elastomer having: a melt flow rate (ASTM D1238, 230° C., 2.16 kg) of from 1 g/10 min to 60 g/10 min, and a peak melting point of less than 110° C.; a polypropylene comprising from 10 mol % to 100 mol % propylene based on a total weight of the polypropylene, the polypropylene having a melt flow rate of from 2 g/10 min to 35 g/10 min (ASTM D1238, 230° C., 2.16 kg); and a filler, wherein the slit film tape composition has an ash % of 15% or less.

In another embodiment, an article comprising a slit film tape composition is provided.

DETAILED DESCRIPTION

The present disclosure relates to slit film tape compositions. Specifically, the disclosure relates to the slit film tape compositions having increased tenacity, higher elongation, less tape breakage, and higher resistance to UV degradation, among other characteristics. Raffia bags, which can be made from slit film tapes, are useful for packing, storing, loading, transporting and unloading of, e.g., cement, fertilizers, and food grains.

The slit film tape compositions disclosed herein (also known as raffia tapes, film bands, strips, stretched tapes, tape yarn and mono-axially oriented tapes) include a propylene-based elastomer, a polypropylene, and a filler.

Conventional slit film tape compositions include polypropylene homopolymer and a high load of filler composition. This filler composition contains polypropylene homopolymer loaded with 80 wt % or more of $CaCO_3$ to reduce tape cost. As the amount of filler in the composition increases, the mechanical strength of the tapes decreases, and depending on application, processing is an issue due to frequent tape breaking in raffia lines and looms, as well as dusting, leading to high down times. In addition, there is an emerging requirement for stronger tapes in order to reduce bag weight for environmental and economic reasons. Further, cement bag makers are concerned with ash content, which is a measure of $CaCO_3$ content, of the composition. Increased $CaCO_3$ is detrimental to the UV resistance of the bags. Conventional filler compounds have high $CaCO_3$ content.

The inventors have discovered that an "enhancer" route (e.g., a polymer rich formulation having lower amounts of $CaCO_3$, e.g., 74%) using Vistamaxx™ 3588 and Vistamaxx™ 6502 in the filler compounds, improves tape properties, processability, and impact shock absorption during bag drop, each of which leads to less waste and cost reduction. The propylene-based elastomer, such as Vistamaxx 3588 and Vistamaxx 6502, improves the overall production quality of polypropylene raffia tape by enhancing elongation and tenacity, two properties critical in manufacturing. Because these newly discovered tapes have higher tenacity, the tapes can be stretched further and processed advantageously with less tape breakage. This extra stretch leads to higher mechanicals of finished tape. The inventors have discovered that utilizing these performance polymers in enhancers helps improve the elongation of the tape and allows for partial replacement of propylene, thus reducing the costs of the tapes while maintaining/improving the quality of the tapes.

For purposes of this disclosure, the term copolymer refers to any polymer including two or more monomers, and when a polymer or copolymer is referred to as including a monomer, the monomer present in the polymer or copolymer is the polymerized form of the monomer.

For purposes of this disclosure, the term film applies to fabricated articles, extruded or otherwise.

For purposes of this disclosure, the terms "polypropylene," "propylene polymer," "polypropylene," or "PP" refers to homopolymers, copolymers, terpolymers, including from about 50 wt % to about 100 wt % of propylene-derived units based upon total weight.

For purposes of this disclosure, "ethylene-based polymer" refers to homopolymers, copolymers, and terpolymers, including from about 50 wt % to about 100 wt % of ethylene-derived units based upon total weight.

For purposes of this disclosure, "neat" refers to a component that has not been blended with polymer or non-polymer to form a masterbatch.

For purposes of this disclosure, "polypropylene" refers to an olefin polymer having a peak melting point ($T_m$) of at least 115° C.

For purposes of this disclosure, "propylene elastomer" (e.g., "semi-amorphous polymer") refers to an olefin polymer having a peak melting point ($T_m$) of less than 115° C.

For purposes of this disclosure, peak melting temperature ($T_m$), peak crystallization temperature ($T_c$), heat of fusion ($H_f$), and percent crystallinity are determined using the following are determined using the following procedure according to ASTM E794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to about −50° C. and then gradually heating it to about 200° C. at a rate of about 10° C./minute. The sample is kept at about 200° C. for about 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For the semi-crystalline polymers, having appreciable crystallinity, the melting temperature is typically measured and reported during the second heating cycle (or second melt). For the semi-amorphous polymers, having comparatively low levels of crystallinity, the melting temperature is typically measured and reported during the first heating cycle. Prior to the DSC measurement, the sample is aged (typically by holding it at about ambient temperature for a period up to about 5 days) or annealed to maximize the level of crystallinity.

For purposes of this disclosure, melt flow rate (MFR) is determined according to ASTM D1238 (2.16 kg and 230° C., ASTM D1238) unless otherwise noted.

For purposes of this disclosure, molecular weight (Mn and Mw) and molecular weight distribution (MWD or Mw/Mn) are determined by gel permeation chromatography using polystyrene standards as described in WO 2006/065648.

As stated above, the blends (which are used for the slit film tape compositions) include a propylene-based elastomer, a polypropylene, and a filler component. These are described in more detail below.

Propylene-Based Elastomer

In various embodiments, the blends described herein include from about 0.1 wt % to about 50 wt % of a propylene-based elastomer (based upon the total weight of the blend), such as from about 1 wt % to about 50 wt %, such as from about 2 wt % to about 20 wt %, such as from about 3 wt % to about 10 wt %.

The propylene-based elastomer useful for the blends described herein has one or more of the following properties:

(1) An isotactic propylene crystallinity that has a percent crystallinity of about 1% to about 30%, such as from about 3% to about 25%, such as from about 4% to about 20%, for example from about 5% to about 18%. Percent crystallinity is determined as noted above.

(2) A propylene content that is from about 70 wt % to about 99 wt % propylene, such as from about 70 wt % to about 97 wt % propylene, such as from about 70 wt % to about 96 wt %, such as from about 80 wt % to about 96 wt % (based upon the total weight of propylene-based elastomer).

(3) An amount of $C_2$ to $C_{20}$ α-olefin comonomers that is from about 1 wt % to about 30 wt % of one or more $C_2$ to $C_{20}$ α-olefin comonomers (based on the total weight of the propylene-based elastomer), such as from about 5 wt % to about 30 wt %, such as from about 5 wt % to about 25 wt %, such as from about 5 wt % to about 20 wt %, such as from about 5 wt % to about 15 wt %, for example about 13 wt %. Alternately, and in some embodiments, the propylene-based elastomer has an amount of $C_2$ to $C_{20}$ α-olefin comonomers that is less than about 5 wt %, such as from about 1 wt % to about 4 wt %, for example, about 1 wt %, about 2 wt %, about 3 wt %, or about 4 wt %. In some embodiments the α-olefin comonomer is a $C_2$ to $C_{10}$ α-olefin, such as an α-olefin selected from the group consisting of ethylene, butene, pentene, hexene, heptene, octene, nonene, and decene, for example ethylene, butene, hexene, and octene, such as ethylene. For purposes herein, when a copolymer is described as including propylene and one or more $C_2$ to $C_{10}$ α-olefins, the $C_2$ to $C_{10}$ α-olefins do not include $C_3$. Likewise, ethylene is considered an α-olefin. The ethylene content of the propylene-based elastomer can be determined as described in WO 2006/065648, page 13, et seq.

(4) A melt flow rate (MFR) that is from about 1 g/10 min to 60 g/10 min, such as from about 2 g/10 min to 35 g/10 min, such as from about 2 g/10 min to about 20 g/10 min, such as 2 g/10 min to about 8 g/10 min, for example about 8 g/10 min. In various embodiments, the propylene-based elastomer has a melt flow rate of about 35 g/10 min or more, such as from about 35 g/10 min to about 60 g/10 min, such as from about 45 g/10 min to about 60 g/10 min, such as from about 45 g/10 min to about 55 g/10 min, such as from about 45 g/10 min to about 50 g/10 min, such as about 48 g/10 min MFR is measured according to ASTM D1238 (2.16 kg, 230° C.).

(5) A peak melting point ($T_m$) that is about 115° C. or less, such as about 110° C. or less. In some embodiments, the $T_m$ is from about 25° C. to about 120° C., such as from about 25° C. to about 115° C., such as from about 35° C. to about 110° C., such as from about 35° C. to about 80° C. The $T_m$ is measured by the DSC procedure as noted above.

(6) A density that is from about 0.86 g/cm³ to about 0.925 g/cm³, for example from about 0.86 g/cm³ to about 0.90 g/cm³, for example from about 0.86 g/cm³ to about 0.89 g/cm³. Density is determined according to ASTM D1505.

(7) A Shore (A/D) hardness that is from about 20 A to about 60 D, such as from about 40 A to about 80 A, such as from about 50 A to about 75 A, for example about 71 A. Alternately, and in some embodiments, the Shore hardness is from about 20 D to about 70 D, such as from about 20 D to about 60 D, such as from about 40 D to about 55 D, for example about 52 D. Shore hardness is measured according to ASTM D2240.

(8) A tensile strength at break that is from about 2 MPa to about 40 MPa, such as from about 2 MPa to about 30 MPa, such as from about 5 MPa to about 25 MPa or from about 25 MPa to about 30 MPa, such as about 25.1 MPa. In some embodiments, the tensile strength at break is from about 5 MPa to about 40 MPa, such as from about 18 MPa to about 40 MPa or from 5 MPa to about 15 MPa, such as from about 5 MPa to about 10 MPa, for example about >9.65 MPa. The tensile strength at break is determined according to ASTM D638.

(9) An elongation at break that is about 300% or more, such as from about 500% to about 2500%, such as from 600% to about 2000%, for example about 617% or about >1900%. In some embodiments, the elongation at break is 1600% or less or from about 1000% to about 2500%. The elongation at break is determined according to ASTM D638.

(10) A 1% secant flexural modulus (at break) that is from about 1 MPa to about 100 MPa, such as from about 10 MPa to about 50 MPa, such as from about 10 MPa to about 25 MPa, for example about 20.5 MPa. Alternately, and in some embodiments, the 1% secant flexural modulus (at break) is greater than about 120 MPa, such as from about 120 MPa to about 500 MPa, such as from about 150 MPa to about 500 MPa, such as from about 200 MPa to about 450 MPa, such as from about 300 MPa to about 400 MPa, such as from about 350 MPa to about 400 MPa, for example about 394 MPa. The 1% secant flexural modulus (at break) is determined according to ASTM D790.

(11) A tear strength (die C) that is from about 1 N/mm to about 50 N/mm, such as from about 10 N/mm to about 50 N/mm, such as from about 20 N/mm to about 40 N/mm, for example about 38.4 N/mm Alternately, and in some embodiments, the tear strength (die C) is greater than about 50 N/mm, such as from about 50 N/mm to about 150 N/mm, such as from about 85 N/mm to about 150 N/mm, such as from about 100 N/mm to about 140 N/mm, for example about 125 N/mm. The tear strength (die C) is determined according to ASTM D624.

(12) A vicat softening point (200 g load) that is about 40° C. or more, such as from about 40° C. to about 60° C., such as from about 50° C. to about 55° C., for example about 52° C. Alternately, and in some embodiments, the vicat softening point (200 g) is about 80° C. or more, such as from about 80° C. to about 120° C., such as from about 90° C. to about 110° C., for example about 103° C.

(13) An intermolecular composition distribution that is about 75% or more, such as about 80% or more, such as about 85% or more, such as about 90% or more by weight of the polymer isolated as one or two adjacent, soluble fractions with the balance of the polymer in immediately preceding or succeeding fractions; and wherein each of these fractions has a wt % comonomer content with a difference of no greater than about 20 wt % (relative), such as about 10 wt % (relative), of the average wt % comonomer of the copolymer. The fractions are obtained at temperature increases of approximately 8° C. between stages. The intermolecular composition distribution of the copolymer is determined by thermal fractionation in hexane as described in WO 2006/065648, page 14, et seq.

(14) A molecular weight distribution (MWD=(Mw/Mn)) that is from about 1 to about 40, such as from about 1 to about 5, such as from about 1.8 to about 5, such as from about 1.8 to about 3, such as from about 1.5 to about 3.

(15) A weight average molecular weight that is from about 100,000 to about 1,000,000, such as from about 150,000 to about 500,000 g/mol. Techniques for determining the molecular weight (Mn and Mw) and molecular weight distribution (MWD) may be found in U.S. Pat. No. 4,540,753 (which is incorporated by reference herein for purposes of U.S. patent practice) and references cited therein and in Verstrate et al., Macromolecules, 1988, volume 21, p 3360 (which is incorporated by reference herein for purposes of U.S. patent practice), and references cited therein.

(16) A heat of fusion that is within the range having an upper limit of about 75 J/g, about 70 J/g, or about 25 J/g and a lower limit of about 1 J/g, about 3 J/g, or about 10 J/g. Heat of fusion is measured according to (what method).

In some embodiments the polymer is a random copolymer of propylene and at least one comonomer selected from ethylene, $C_4$-$C_{12}$ α-olefins, and combinations thereof. In this embodiment, the random copolymers of propylene include from about 5 wt % to about 18 wt % polymerized ethylene units based on the total weight of the polymer; have a narrow intermolecular composition distribution (e.g., 75% or more); and have a molecular weight distribution Mw/Mn of from about 1.8 to about 4.5.

In various embodiments, polymers that are useful herein as a propylene-based elastomer include homopolymers and random copolymers of propylene and contain stereoregular propylene crystallinity, for example isotactic stereoregular propylene crystallinity. "Stereoregular" refers to the predominant amount, e.g., greater than about 80%, of the propylene resides in the polypropylene exclusive of any other monomer such as ethylene, has the same 1,2 insertion and the stereochemical orientation of the pendant methyl groups is the same, either meso or racemic.

In some embodiments, a polymer useful herein as a propylene-based elastomer is a polymer with crystallinity due to stereoregular propylene sequences. The polymer can be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In an embodiment, the propylene-based elastomer further includes a non-conjugated diene monomer to aid in later chemical modification of the blend composition (such as crosslinking). In some of these embodiments, the amount of diene present in the polymer is about 10 wt % or less, such as about 5 wt % or less based upon total weight of the polymer. The diene may be any non-conjugated diene which is commonly used in ethylene propylene copolymers including ethylidene norbornene, vinyl norbornene, and dicyclopentadiene.

In an embodiment, the propylene-based elastomer is a random propylene copolymer having a narrow composition distribution. In another embodiment, the propylene-based elastomer is a random propylene copolymer having a narrow composition distribution and a peak melting point of from about 25° C. to about 115° C., such as from about 35° C. to about 110° C., such as from about 35° C. to about 107° C. The copolymer is described as random because for a polymer including propylene, comonomer, and optionally diene, the number and distribution of comonomer residues is consistent with the random statistical polymerization of the monomers.

In some embodiments, the propylene-based elastomer has a propylene tacticity index (m/r) ranging from a lower limit of about 4 or about 6 to an upper limit of about 8, about 10, or about or 12. The propylene tacticity index, expressed herein as "m/r", is determined by $^{13}$C nuclear magnetic resonance (NMR). The propylene tacticity index m/r is calculated as defined in H. N. Cheng, Macromolecules, 17, 1950 (1984). The designation "m" or "r" describes the stereochemistry of pairs of contiguous propylene groups, "m" referring to meso and "r" referring to racemic. An m/r ratio of about 0 to less than about 1.0 generally describes a syndiotactic polymer, an m/r ratio of about 1.0 an atactic material and an m/r ratio of greater than 1.0 an isotactic material. Isotactic materials theoretically have a ratio approaching infinity, and many by-product atactic polymers have sufficient isotactic content to result in ratios of greater than about 50.

As used herein, isotactic propylene tacticity is defined to be an mm triad tacticity of at least 70%. In various embodiments, the propylene-based elastomer useful herein have an mm triad tacticity of three propylene units, as measured by $^{13}$C NMR, of at least 70%, such as about 75% or greater, such as about 80% or greater, such as about 82% or greater, such as about 85% or greater, or such as about 90% or greater. The triad tacticity is determined from a $^{13}$C NMR spectrum of the polymer as described below and as described in U.S. Pat. No. 5,504,172. The mm triad tacticity of a polymer is the relative tacticity of a sequence of three adjacent propylene units, a chain consisting of head to tail bonds, expressed as a binary combination of m and r sequences. It is usually expressed for semi-amorphous copolymers described herein as the ratio of the number of units of the specified tacticity to all of the propylene triads in the copolymer. The mm triad tacticity (mm fraction) of a propylene copolymer can be determined from a $^{13}$C NMR spectrum of the propylene copolymer and the following formula:

$$mm\ \text{Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

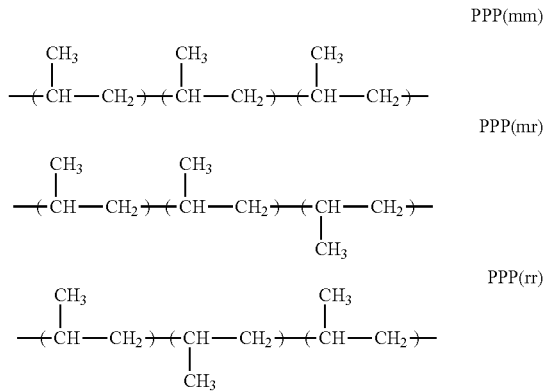

In some embodiments, the propylene-based elastomer is made using a metallocene catalyst system as described in WO 2006/065648.

Commercial examples of such propylene-based elastomers include Vistamaxx™ from ExxonMobil Chemical Company (e.g., Vistamaxx™ Specialty Elastomers 3588 and 6502), Tafmer™ elastomers from Mitsui Chemicals, Versify™ elastomers from Dow Chemical Company, and certain grades of Softel™ from Basell Polyolefins, Netherlands.

Table A shows some chemical and mechanical properties of Vistamaxx™ 3588 and Vistamaxx™ 6502 and the comparatives Vistamaxx™ 6102 and 6202. Density was determined according to ASTM D1505. MFR was determined according to ASTM D1238 (230° C., 2.16 kg). Durometer Hardness (Shore D/A) was determined according to ASTM D2240. Tensile strength at break and elongation at break were determined according ASTM D638. The 1% secant flexural modulus was determined according to ASTM D790. Tear strength (die C) was determined according to ASTM D624. Vicat softening temperature was determined according to (200 g load).

TABLE A

| Properties | Examples | | Comparatives | |
| --- | --- | --- | --- | --- |
| | Vistamaxx 3588 | Vistamaxx 6502 | Vistamaxx 6102 | Vistamaxx 6202 |
| Ethylene Content | 4 wt % | 13 wt % | 16 wt % | 15 wt % |
| Density | 0.889 g/cm³ | 0.865 g/cm³ | 0.862 g/cm³ | 0.863 g/cm³ |
| MFR (230° C., 2.16 kg) | 8 g/10 min | 48 g/10 min | 3 g/10 mm | 20 g/10 min |
| Durometer Hardness (Shore D/A) | 52D | 71A | 66A | 66A |
| Tensile Strength at Break | 25.1 MPa | >9.65 MPa | >6.89 MPa | >5.5 MPa |
| Elongation at Break | 617% | >1900% | >2000% | >2000% |
| 1% Secant Flexural Modulus | 394 MPa | 20.5 MPa | 12.3 MPa | 12.3 MPa |
| Tear Strength (Die C) | 125 N/m | 38.4 N/m | 34 N/m | 33 N/m |
| Vicat Softening Temperature | 103° C. | 52° C. | 52° C. | 47° C. |

Approximate values for properties of the propylene-based elastomer.

In some embodiments, the propylene-based elastomer is used in an enhancer formulation that is then blended with, at least, a polypropylene, and a filler. In some embodiments, the enhancer formulation includes a propylene-based elastomer, a polypropylene, CaCO$_3$, an antioxidant, and a processing aid.

Polypropylene

In various embodiments, the blends described herein include from about 50 wt % to about 99 wt % of a polypropylene (based upon the total weight of the blend), such as from about 60 wt % to about 98 wt %, such as from about 70 wt % to about 98 wt %, such as from about 80 wt % to about 98 wt %, such as from about 90 wt % to about 97 wt %.

The polypropylene useful for the blends described herein has one or more of the following properties:

(1) A propylene content that is from about 10 mol % to about 100 mol % (based upon the total moles of the polypropylene), such as from about 90 mol % to about 100 mol % propylene, such as from about 95 mol % to about 99.5 mol %, such as from about 97 mol % to about 99 mol %, such as about 100 mol %.

(2) An α-olefin other than propylene that is from about 0 mol % to about 90 mol % (based upon the total moles of the polypropylene), such as from about 0 mol % to about 10 mol %, such as from about 0.5 mol % to about 5 mol %, such as from about 1 mol % to about 3 mol %. In some embodiments, the polypropylene further includes at least two α-olefins other than propylene. In some embodiments, the α-olefins are $C_2$ to $C_{10}$ α-olefins, such as α-olefins selected from the group consisting of ethylene, butene, pentene, hexene, heptene, octene, nonene, and decene, such as ethylene, butene, hexene, and octene, such as ethylene.

(3) A peak melting point ($T_m$, as measured by DSC as noted above) that is at least about 115° C., such as from about 120° C. to about 170° C., such as from about 130° C. to about 165° C., such as from about 140° C. to about 165° C., such as from about 145° C. to about 160° C.

(4) A heat of fusion that is greater than about 60 J/g, such as greater than about 70 J/g, such as greater than about 80 J/g, as determined by DSC analysis as noted above.

(5) A melt flow rate that is from about 0.1 g/10 min to about 35 g/10 min, such as from about 2 g/10 min to about 35 g/10 min, such as from about 0.1 g/10 min to about 20 g/10 min, such as from about 3 g/10 min to about 15 g/10 min, such as from about 2 g/10 min to about 8 g/10 min. Melt flow rate is measured according to ASTM D1238 Condition L (2.16 kg, 230° C.).

(6) An elongation at maximum force that is about 20% or less, such as from about 5% to about 15%, such as about 10% as measured by ASTM D638.

(7) A 1% secant flexural modulus of from about 100,000 psi to about 250,000 psi (about 690 MPa to about 1720 MPa), such as from about 150,000 psi to about 250,000 psi (from about 1031 MPa to about 1720 MPa) as measured by ASTM D790A (0.05 in/min/1.3 mm/min). "High-crystallinity polypropylenes," e.g., those having values above about 250,000 psi (about 1720 MPa) can be used.

(8) A molecular weight that is from about 10,000 g/mol to about 5,000,000 g/mol, such as from about 25,000 g/mol to about 500,000 g/mol.

(9) A Mw/Mn that is from about 1.5 to about 4, such as from about 1.5 to about 3.

In various embodiments, the polypropylene may be isotactic, highly isotactic, syndiotactic, or highly syndiotactic. In an embodiment, the polypropylene is an isotactic polypropylene (such as an isotactic polypropylene). In another embodiment, the polypropylene is a highly isotactic polypropylene. "Isotactic" refers to polypropylenes having at least about 10% isotactic pentads, such as having at least about 40% isotactic pentads of methyl groups derived from propylene according to analysis by $^{13}$C NMR as described in U.S. Pat. No. 5,504,172. "Highly isotactic" refers to polypropylenes having at least about 60% isotactic pentads according to analysis by $^{13}$C NMR as described in U.S. Pat. No. 5,504,172 and above. In an embodiment, a polypropylene homopolymer or copolymer having at least about 85% isotactic pentads is the polypropylene. In an embodiment, the polypropylene has at least about 90% syndiotactic pentads. "Syndiotactic" refers to polypropylenes having at least about 10% syndiotactic pentads, such as at least about 40%, according to analysis by $^{13}$C NMR as described in U.S. Pat. No. 5,504,172. As used herein, "highly syndiotactic" refers to polypropylenes having at least about 60% syndiotactic pentads according to analysis by $^{13}$C NMR as described in U.S. Pat. No. 5,504,172.

Any polypropylene having about 0 wt % to about 5 wt % comonomer, a peak melting point of from about 115° C. to about 170° C., and an MFR of 35 g/10 min or less may be used herein. Suitable examples include polymers produced by Ziegler Natta catalyst systems, single-site (e.g., metallocene) systems, and combinations thereof. The polymers may be produced by any means including solution, slurry, gas phase, supercritical or high pressure. In an embodiment, the propylene polymers useful herein have a molecular weight distribution (Mw/Mn) of about 5 or less, such as from about 1.5 to about 4, such as from about 1.5 to about 3. In an embodiment, propylene polymers useful herein include those produced by metallocene catalyst systems. In another embodiment, propylene polymers useful herein include those having a composition distribution breadth index (CDBI) of about 60% or more, such as about 70% or more, such as about 80% or more, such as about 90% or more. CDBI is measured as described in WO 93/03093, with the modification that any fractions having a weight average molecular weight (Mw) below 25,000 g/mol are disregarded.

Exemplary polymers useful as the polypropylene include propylene polymers sold by ExxonMobil Chemical Company in Houston, Tex. under the grade names: PP2822E1 and PP3255E2. Other exemplary polypropylenes include those propylene homopolymers and random copolymers available from ExxonMobil Chemical Company under the grade names: PP1042, PP1032, PP1043N, PP1052, PP1063L1, PP1222F, PP5722E1, PP2252E1, PP2252E4, PP4772, PP4062C8, PP4152F2, PP4342C3, PP4352F1, PP4712E1, PP5112E1, PP5122E1, PP5032E1 and PP1572. Further exemplary polymers useful as the polypropylene include polymers under the trade names Repol™ (available from Reliance Industries Limited), and propylene polymers available from Borouge and IOCL.

In various embodiments, the polypropylene is a polypropylene homopolymer.

Filler

In various embodiments, the blends described herein include about 0.1 wt % to about 50 wt % of filler, such as from about 0.5 wt % to about 40 wt %, such as from about 1 wt % to about 30 wt %, based upon total weight of the blend. In some embodiments, the blends include about 20 wt % to about 45 wt % of filler.

Suitable fillers include titanium dioxide, silicon carbide, silica (and other oxides of silica, precipitated or not), antimony oxide, lead carbonate, zinc white, lithopone, zircon, corundum, spinel, apatite, barytes powder, barium sulfate, magnesite, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, other metal oxides and carbonates, metal hydroxides, chrome, phosphorous and brominated flame retardants, antimony trioxide, silica, silicone, and blends thereof. These fillers may include any other fillers and porous fillers known in the art, and may have the other additives (such as colorants or oils) pre-contacted, or pre-absorbed into the filler prior to addition to the blend. Calcium carbonate may also be used.

In various embodiments, the filler is added to the blend via a masterbatch with polymer. The polymer may be a polyethylene, propylene elastomer, polypropylene, ethylene-based polymer, polybutene, or other polyolefin. These components may be the same or different as the propylene-based elastomer or polypropylene present in the blend.

In some embodiments the filler is typically present in the masterbatch at up to about 90 wt %, such as from about 0.1 wt % to about 80 wt %, such as from about 1 wt % to about 75 wt %, based upon the weight of the masterbatch. Information on preparing and using propylene elastomers as masterbatches is available in U.S. Publication No. 2006/0247332A1.

In some embodiments, the filler includes from about 1 wt % to about 99 wt % of a salt (based upon the total weight of the filler), which is an ionic compound(s) including cations and anions such that the product is electrically neutral. In various embodiments, the salt is calcium carbonate.

In an embodiment, the inorganic salt is blended with from about 1 wt % to about 99 wt % of an ethylene-based polymer, such as from about 5 wt % to about 80 wt %, such as from about 10 wt % to about 60 wt % (based on total weight of filler). The ethylene-based polymer may include from about 50 mol % to about 95 mol % ethylene, such as from about 85 mol % to about 95 mol %, such as from about 90 mol % to about 95 mol % (based on the total moles of ethylene-based polymer in the filler). The ethylene-based polymer includes about 5 mol % to about 20 mol % of at least one α-olefin other than ethylene, such as from about 5 mol % to about 15 mol %, such as from about 5 mol % to about 10 mol % (based on the total moles of ethylene-based polymer in the filler), and have a CDBI of about 90% or greater, such as 95% or greater (measured according to the techniques provided herein). In various embodiments, the ethylene copolymer has a density of from about 0.86 g/cm$^3$ to about 0.925 g/cm$^3$ and a CDBI of about 90% or more, such as from about 95% to about 99%. The ethylene copolymer density is determined according to ASTM D1505. In this and other embodiments, the ethylene copolymer has a melt flow rate at 190° C. of about 0.1 g/10 min to about 100 g/10 min, such as from about 0.5 g/10 min to about 50 g/10 min, such as from about 0.8 g/10 min to about 30 g/10 min (ASTM D1238, 190° C., 2.16 kg).

When selecting polymers and masterbatches to use in the filler, it may be desirable to match properties of the individual polymers, such as rheological properties and/or melt flow rates. For example and in some embodiments, the propylene-based elastomer, the polypropylene, and the masterbatch polymer have similar MFRs (such as within about 5 g/10 min of the polypropylene, for example within about 3 g/10 min of the polypropylene).

In some embodiments, the filler includes polypropylene, CaCO$_3$, an antioxidant, and a processing aid.

Additional Polymer Components

In various embodiments, the blends herein may further include one or more additional polymer components. Any suitable polymer may be used. For example, the additional polymer component may include low density polyethylene (density of from about 0.915 g/cm$^3$ to about 0.935 g/cm$^3$), linear low density polyethylene (density of from about 0.89 g/cm$^3$ to about 0.92 g/cm$^3$), ultra low density polyethylene (density of from about 0.85 g/cm$^3$ to about 0.90 g/cm$^3$), medium density polyethylene (density of from about 0.926 g/cm$^3$ to about 0.94 g/cm$^3$), high density polyethylene (density of from about 0.945 g/cm$^3$ to about 0.98 g/cm$^3$), or combinations thereof. For example, metallocene-catalyzed polyethylenes (mPEs) can be used. In a particular example, mPE homopolymers and copolymers are those produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Illustrative commercially available products are available from ExxonMobil Chemical Company, Houston, Tex., under the tradenames EXCEED™ and EXACT™, among others well known in the industry. Blends where the third component is a propylene polymer or copolymer, an EP or EPDM copolymer rubber, another polyolefin (e.g., EVA ethylene vinylacetate) are also envisioned.

Additives

In various embodiments, the blends herein may further include one or more additives. Such additives include processing waxes and antioxidants. Examples of processing waxes and antioxidants include Mitsui Hi Wax TKP01 and Kinox 68, respectively.

Blend Formation

The blends herein can be prepared by any procedure that causes the intimate admixture of the components. For example, they may be blended in a tumbler, static mixer, batch mixer, extruder, or a combination thereof. Moreover, the polypropylene may be polymerized in one reactor (or one stage of one reactor) and transferred to a different reactor or different stage of the same reactor, where polymerization of the propylene-based elastomer occurs.

The blends may also be prepared by post-reactor mixing of the propylene-based elastomer and the polypropylene. The mixing step may take place as part of a processing method used to fabricate articles, such as in the extruder on a film or tape line. Likewise, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation 10 times.

The propylene-based elastomer may be present in the slit film tape composition through direct addition to the polypropylene, through use as the base material for the filler, or both.

In some embodiments, the blends have a melt flow rate (ASTM D1238 Condition L: 230° C., 2.16 kg) of from about 0.1 g/10 min to about 60 g/10 min, 0.1 g/10 min to about 35 g/10 min, such as from about 0.5 g/10 min to about 15 g/10 min, such as from about 1 g/10 min to about 10 g/10 min.

Slit Film Tapes Formation

In various embodiments, the slit film tapes described herein may be formed using various processes known in the art.

In some embodiments, a method for preparing the slit film tapes includes: a) combining the propylene-based elastomer, polypropylene, and filler into a combination; b) forming the combination into a film; and c) slitting the film sheet into a plurality slit film tapes.

In various embodiments, the tapes disclosed herein may be formed by direct extrusion (e.g., extrusion without slitting the film sheet).

In various embodiments, the method for preparing the slit film tapes may further include one or more of stretching the film at elevated temperature (such as by passing the slit film tapes through a heating medium at a temperature just below the Softening temperature of the slit film tapes), quenching the film, annealing and/or cooling the slit film tapes, and winding the slit film tapes.

In some embodiments, the method may further include weaving the slit film tapes into articles such as fabrics and/or forming the slit film tapes into articles such as bags, sacks, woven sacks, large industrial sacks and packaging fabrics, geo-textiles, carpet backing, carpet fibers, carpet yarn, ropes and twines and miscellaneous industrial woven fabrics.

In some embodiments, the method may further include mono-axially orienting the tapes by drawing in a longitudinal direction (machine direction), under heated conditions, to arrive at slit film tapes which can be described in terms of an orientation ratio, sometimes also referred to as the draw or stretch ratio. In some embodiments, tapes have an orientation ratio of from about 4 to about 5.

In some embodiments, a process for making a slit film tape is the process described in U.S. Pat. No. 9,062,169, which is incorporated by reference herein in its entirety.

In various embodiments, the slit film tapes are laminated, by extrusion lamination or other methods, to other monolayer or multilayer films.

In addition to the processes described in U.S. Pat. No. 9,062,169, the film tapes can be prepared by any fabricating mode recognized in the industry, such as film casting and film blowing. Slit film tapes can also be produced from extruded cast flat or tubular (blown) film. The tapes may also be made by method and device using several bundles of slit film tapes can be seen in WO 2006/037571, which is incorporated by reference herein in its entirety. According to this method, prior to the drawing process the group of slit film tapes (strips) is separated into several subgroups of slit film tapes and then subgroups are drawn separately at high speed.

Slit Film Tape Properties

In various embodiments, the slit films disclosed herein have one or more of the following properties:

A tenacity that is about 3 gpd or more, such as about 4 gpd or more, such as about 5 gpd or more, such as about 5.5 gpd or more (grams-force per denier). In some embodiments, the tenacity is from about 3 gpd to about 10 gpd, such as from about 3 gpd to about 6 gpd. Tenacity is defined as the tensile stress divided by tape weight in denier. Tensile stress is determined according to ASTM D882. Denier (measure of weight of the tape) is defined as the weight in grams of a tape yarn of 9000 meters in length.

A percent elongation of about 16% or more, such as about 18% or more, such as about 21% or more, such as about 23% or more. In some embodiments, the percent elongation is from about 15% to about 30%, such as from about 15% to about 25%, such as from about 16% to about 25%. Percent elongation is defined as the elongation expressed as a percentage of the gage length as determined by ASTM D882.

An ash content (%) that is less than about 10%, such as less than about 8.7%, such as about 8.4% or less, such as from about 0.1% to about 8.4%, such as from about 1% to about 8.4%.

A $CaCO_3$ content (wt %) in finished tapes that is less than about 20 wt %, such as less than about 15.5% wt %, such as 15 wt % or less, such as from about 0.1% to about 15%, such as from about 1% to about 15%.

EXAMPLES

Table 1 shows the enhancer formulations used for making the slit film tape compositions. The enhancer formulations are prepared according to techniques known in the art. A kneader or twin screw extruder may be used. The pre-weighed amounts of ingredients are loaded into the kneader to form a semi-molten dough. The semi-molten dough is then fed to a granulator extruder to form the enhancer formulation.

TABLE 1

Enhancer Formulations

| Ingredients | Weight Percent[‡] | | | |
| --- | --- | --- | --- | --- |
| | Enhancer Formulation 1 | Enhancer Formulation 2 | Enhancer Formulation 3 | Enhancer Formulation 4 |
| Reliance Repol™ 350 FG | 10 | 12.5 | 15 | 12.5 |
| Vistamaxx™ 6502 | 15 | 12.5 | 10 | — |
| Vistamaxx™ 3588 | — | — | — | 12.5 |
| Calcium Carbonate (mean particle size 2.4 µm) | 74 | 74 | 74 | 74 |
| Zinc stearate | 0.4 | 0.4 | 0.4 | 0.4 |
| Processing wax | 0.5 | 0.5 | 0.5 | 0.5 |
| Antioxidant | 0.1 | 0.1 | 0.1 | 0.1 |

[‡]Approximate values for weight percent.

Reliance Repol™ 350 FG is a polypropylene homopolymer, having an MFR of 35 g/10 min. The properties of Vistamaxx™ 3588 and Vistamaxx™ 6502 are provided above.

The processing wax can be a processing aid that acts as a dispersant and/or a release agent. For example, a polyethylene wax such as Hi Wax TKP01 available from Mitsui can be used as the processing wax. The antioxidant can be a phosphite-based antioxidant, such as Kinox-68 available from HPL Additives.

The slit film tape compositions provided in Tables 2, 3, 4, and 5 are prepared in a compounding extruder operating at a temperature above the melting temperature for all polymeric components. The blend is then processed on a commercially available Raffia tape line (e.g., a Konark Raffia Tape Line or a JP Industries Tape Stretching Line equipped with a 0.5 to 2 m die running at about 250 kg/hour to about 430 kg/hour and at an extrusion temperature of about 200° C. to about 300° C.). The blend is extruded through the die to form a cast film. The cast film is pulled over one or more cast film rollers which are set at the same of different temperatures to optionally pre-orient the film. The film is then passed through a slit die which cuts the film into a plurality of tapes of 1 mm to 10 cm in width. The tapes are then passed into an oven (set at from about 130° C. to about 200° C.) and stretched in the machine direction to 100% to 6,000% of their original length. The tapes are then passed over a cool roll and wound onto spools. The splitter gap is 5 to 10 mm

TABLE 2

Slit Film Tape Compositions

| | Weight Percent | | |
|---|---|---|---|
| Ingredients | Comparative 1 | Example 1 | Example 2 |
| Repol ™ H030SG | 72.8 | 69.9 | 66.8 |
| Reprocessed Tape | 2.9 | 2.9 | 2.9 |
| Jaifil ™ PP165 SPL | 24.3 | 24.3 | 24.3 |
| Enhancer Formulation 2 | — | 2.9 | 6.0 |
| Total | 100 | 100 | 100 |
| Properties‡ | | | |
| Tenacity (gpd) | 4.66 | 4.80 | 5.24 |
| Elongation at maximum force (%) | 18 | 18 | 18 |

‡Tenacity and percent elongation were determined by ASTM D882. Approximate values for weight percent and mechanical properties.

Repol™ H030SG is a polypropylene homopolymer available from Reliance Industries Limited. Reprocessed tape refers to the previously run waste tapes and/or cut pieces that is molten, granulated, and added to the slit film tape compositions. Jaifil™ PP165 SPL is a $CaCO_3$ based Filler Masterbatch available from Jai Corp, LTD.

The results in Table 2 show that the slit film tape compositions with Vistamaxx™ 6502 (Examples 1 and 2) have improved tape properties and processability (e.g., higher tenacity) compared to a conventional formulation represented by Comparative 1. During trial observations, the slit film tape compositions had less tape breakage, less dusting, and less water carry over than Comparative 1. These results also show that slit film tape compositions with Vistamaxx™ 6502 are much stronger and flexible than conventional slit film tapes.

TABLE 3

Slit Film Tape Compositions

| | Weight Percent | |
|---|---|---|
| Ingredients | Comparative 2 | Example 3 |
| Borouge ™ HOE111NP | 40.5 | 40.5 |
| IOCL ™ 1030RG | 40.5 | 40.5 |
| Reprocessed Tape | 8.5 | 8.5 |
| Shreya Filler MB | 6.5 | — |
| Omega Enhancer | 4.0 | — |
| Enhancer Formulation 4 | — | 10.5 |
| Properties‡ | | |
| Tenacity (gpd) | 4.74 | 5.58 |
| Elongation at maximum force (%) | 16.3 | 23.9 |

‡Tenacity and percent elongation were determined by ASTM D882. Approximate values for weight percent and mechanical properties.

Borouge™ HOE111NP is a polypropylene homopolymer available from Borouge. IOCL™ 1030RG is a polypropylene homopolymer (MFR of about 3.3 g/10 min) available from IOCL, India. Shreya Filler MB is a conventional, $CaCO_3$ rich formulation commercially available from M/s Shreya, India. Omega is a conventional enhancer.

The results in Table 3 show that the slit film tape compositions with Vistamaxx™ 3588 (Example 3) have improved tape properties and processability (e.g., higher tenacity and higher percent elongation) compared to a conventional formulation represented by Comparative 2. As such, the novel slit film tape compositions that include Vistamaxx™ 3588 are much stronger and flexible than conventional slit film tapes.

TABLE 4

Slit Film Tape Compositions

| | Weight Percent | | |
|---|---|---|---|
| Ingredients | Comparative 3 | Example 4 | Example 5 |
| Repol ™ H030SG | 51.0 | 51.0 | 51.0 |
| Sunrise Filler MB | 41.0 | 41.0 | 41.0 |
| Sunrise Enhancer | 8.0 | 4.0 | — |
| Enhancer Formulation 2 | — | 4.0 | 8.0 |
| Total | 100 | 100 | 100 |
| Properties‡ | | | |
| Tenacity (gpd) | 3.01 | 3.21 | 3.31 |
| Elongation at maximum force (%) | 16.5 | 16.5 | 17.0 |

‡Tenacity and percent elongation were determined by ASTM D882. Approximate values for weight percent and mechanical properties.

Sunrise Filler MB is a conventional filler formulation and Sunrise Enhancer is a conventional enhancer. Both of these products are commercially available from Sunrise.

The results listed in Table 4 show that the slit film tape compositions with Vistamaxx™ 6502 (Examples 4 and 5) have improved tape properties and processability (e.g., higher tenacity, higher percent elongation, higher strength, and more flexible) compared to a conventional formulation represented by Comparative 3.

The properties of a slit film tape composition having improved UV resistance over a conventional formulation is shown in Table 5.

TABLE 5

Slit Film Tape Compositions

| | Weight Percent | |
|---|---|---|
| Ingredients | Comparative 4 | Example 6 |
| HEML ™ 03RR | 83 | 80.5 |
| Conventional Filler MB (Konkan ™ FS 301) | 15.5 | — |
| Conventional Enhancer (Konkan ™ SXC 1027) | 1.5 | — |
| Enhancer Formulation 2 | — | 19.5 |
| Total | 100 | 100 |
| Properties‡ | | |
| ash % | 8.7 | 8.4 |
| % $CaCO_3$ | 15.5 | 15.0 |

‡% $CaCO_3$ is calculated by ash % * 100/56. 100/56 is the molecular weight of $CaCO_3$ divided by the molecular weight of CaO. Approximate values for weight percent and mechanical properties.

HEML™ 03RR is a polypropylene homopolymer, having an MFR of about 3.4 g/10 min.

Konkan FS 301 is a conventional filler masterbatch available from Konkan Specialty Products. Konkan SXC 1027 is a conventional enhancer commercially available from Konkan Specialty Products.

Table 5 shows that a lower percentage of polypropylene and replacement of a conventional filler and conventional enhancer leads to a slit film tape composition having less ash %. Such a slit film tape composition will have improved UV resistance due to the lower $CaCO_3$ content. Reduction of the $CaCO_3$ content from 15.5% to 15% greatly reduces the weight of the bag and increases the UV resistance of the bags.

The examples demonstrate that that slit film tape compositions including propylene-based elastomer having one or more of ethylene content below about 5%, a high tensile strength at break (e.g., greater than 25 MPa), a high 1% secant flexural modulus (e.g., greater than 150 MPa), a high tear strength (e.g., greater than 85 N/mm) and a high vicat softening point (e.g., greater than 80° C.) show improved tenacity and percent elongation at maximum force over conventional slit film tape compositions. An example of this is illustrated by slit film tape compositions using Enhancer Formulation 4 (the Vistamaxx™ 3588-based formulation), which provided slit film tape compositions having a tenacity of 5.58 gpd and a 23.9% elongation at maximum force (Table 3), both measurements being much improved over the comparative slit film tape composition. The results show the greater compatibility of Vistamaxx™ 3588 with polypropylene as compared to the components of the conventional formulations and providing greater stretchability in raffia lines.

The examples also demonstrate that slit film tape compositions including propylene-based elastomer having a melt flow rate greater than about 20 g/10 min (such as greater than about 35 g/10 min) show improved tenacity and percent elongation at maximum force over conventional slit film tape compositions. An example of this is illustrated by slit film tape compositions using Enhancer Formulation 2 (the Vistamaxx™ 6502-based formulation), which provided slit film tape compositions having a tenacity of 5.24 gpd and a 18% elongation at maximum force (Table 2), or a tenacity of 3.31 gpd and a 17% elongation at maximum force (Table 4), both measurements being much improved over the comparative, and respective, slit film tape compositions. The results show the greater compatibility of Vistamaxx™ 6502 with polypropylene as compared to the components of the conventional formulations and providing greater stretchability in raffia lines.

Slit film tape compositions using Vistamaxx™ 3588 and Vistamaxx™ 6502 improved tenacity and higher elongation as compared to slit film tapes using polypropylene homopolymer. The examples also show that the slit film tape compositions had better processability (as they are stronger and more flexible), less tape breakage with higher filler loading, and lower material consumption by using blends, coextrusion, and downgauging. Less tape breakage allows for faster line speeds and improved output. Additionally, the examples show that slit film compositions using Vistamaxx™ 3588 and Vistamaxx™ 6502 weigh less and have higher UV resistance as compared to conventional slit tape compositions due to a lower $CaCO_3$ content.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

While the present disclosure has been described with respect to a number of embodiments and examples, those skilled in the art, having benefit of the present disclosure, will appreciate that other embodiments can be devised which do not depart from the scope and spirit of the present disclosure as described herein

We claim:

1. A slit film tape composition comprising:
   a propylene-based elastomer comprising from 5 wt % to 16 wt % ethylene based on a total weight of the propylene-based elastomer, the propylene-based elastomer having a melt flow rate (ASTM D1238, 230° C., 2.16 kg) of from 35 g/10 min to 60 g/10 min;
   a polypropylene comprising from 10 mol % to 100 mol % propylene based on a total weight of the polypropylene, the polypropylene having a melt flow rate (ASTM D1238, 230° C., 2.16 kg) of from 2 g/10 min to 35 g/10 min, a peak melting point (Tm) as measured by DSC of at least 115° C., and a heat of fusion (Hf) that is greater than 70 J/g as determined by DSC analysis; and
   a filler.

2. The slit film tape composition of claim 1, wherein the propylene-based elastomer has a density (ASTM D1505) of from 0.86 g/cm3 to 0.90 g/cm3.

3. The slit film tape composition of claim 1, wherein the propylene-based elastomer has a mm triad tacticity of at least 70%.

4. The slit film tape composition of claim 1, wherein the propylene-based elastomer has a peak melting point of less than 115° C. and the polypropylene is a polypropylene homopolymer.

5. The slit film tape composition of claim 1, wherein the propylene-based elastomer has a:
   Shore hardness (ASTM D2240) of from 40 A to 80 A;
   a tensile strength at break (ASTM D638) of from 5 MPa to 40 MPa; and
   an elongation at break (ASTM D638) of from 1000% to 2500%.

6. The slit film tape composition of claim 1, wherein the propylene-based elastomer has:
   a 1% secant flexural modulus at break (ASTM D790) of from 1 MPa to 100 MPa; and
   a tear strength (die C) (ASTM D624) of from 1 N/mm to 50 N/mm.

7. The slit film tape composition of claim 1, wherein the filler comprises from 1 wt % to 99 wt % of a salt blended with a composition having a melt flow rate (ASTM D1238, 230° C., 2.16 kg) that is within 5 g/10 min of the polypropylene MFR and is selected from the group consisting of a propylene elastomer, a polypropylene, and an ethylene-based polymer.

8. An article comprising the slit film tape composition of claim 1.

9. The slit film tape composition of claim 1, wherein the slit film tape composition has:
a tenacity (ASTM D882) of from 3 gpd to 6 gpd; and
a percent elongation (ASTM D882) of from 16% to 25%.

10. The slit film tape composition of claim 1, wherein the slit film tape composition has an ash % of 15% or less.

11. A slit film tape composition comprising:
a propylene-based elastomer comprising from 1 wt % to 4 wt % ethylene based on a total weight of the propylene-based elastomer, the propylene-based elastomer having a melt flow rate (ASTM D1238, 230° C., 2.16 kg) of from 1 g/10 min to 35 g/10 min;
a polypropylene comprising from 10 mol % to 100 mol % propylene based on a total weight of the polypropylene, the polypropylene having a melt flow rate (ASTM D1238, 230° C., 2.16 kg) of from 2 g/10 min to 35 g/10 min, a peak melting point (Tm) as measured by DSC of at least 115° C., and a heat of fusion (Hf) that is greater than 70 J/g as determined by DSC analysis; and
a filler.

12. The slit film tape composition of claim 11, wherein the propylene-based elastomer has a melt flow rate (ASTM D1238, 230° C., 2.16 kg) of 8 g/10 min.

13. The slit film tape composition of claim 11, wherein the propylene-based elastomer has:
a Shore hardness (ASTM D2240) of from 20 D to 70 D;
a tensile strength at break (ASTM D638) of from 18 MPa to 40 MPa; and
an elongation at break (ASTM D638) of 1600% or less.

14. The slit film tape composition of claim 11, wherein the propylene-based elastomer has:
a 1% secant flexural modulus at break (ASTM D790) of from 120 MPa to 500 MPa; and
a tear strength (die C) (ASTM D624) of from 85 N/mm to 150 N/mm.

15. The slit film tape composition of claim 11, wherein the propylene-based elastomer has a density (ASTM D1505) of from 0.86 g/cm³ to 0.90 g/cm³.

16. The slit film tape composition of claim 11, wherein the propylene-based elastomer has a mm triad tacticity of at least 70%.

17. The slit film tape composition of claim 11, wherein the propylene-based elastomer has a peak melting point of less than 115° C.

18. The slit film tape composition of claim 11, wherein the filler comprises from 1 wt % to 99 wt % of a salt blended with a composition having a melt flow rate (ASTM D1238, 230° C., 2.16 kg) that is within 5 g/10 min of the polypropylene MFR and is selected from the group consisting of a propylene elastomer, a polypropylene, and an ethylene-based polymer.

19. An article comprising the slit film tape composition of claim 11.

20. The slit film tape composition of claim 11, wherein the slit film tape composition has:
a tenacity (ASTM D882) of from 3 gpd to 6 gpd; and
a percent elongation (ASTM D882) of from 16% to 25%.

21. The slit film tape composition of claim 11, wherein the slit film tape composition has an ash % of 15% or less.

22. A slit film tape composition comprising:
a propylene-based elastomer comprising from 5 wt % to 30 wt % ethylene based on a total weight of the propylene-based elastomer, the propylene-based elastomer having a melt flow rate (ASTM D1238, 230° C., 2.16 kg) of from 35 g/10 min to 60 g/10 min;
a polypropylene comprising from 10 mol % to 100 mol % propylene based on a total weight of the polypropylene, the polypropylene having a melt flow rate (ASTM D1238, 230° C., 2.16 kg) of from 2 g/10 min to 35 g/10 min; and
a filler.

23. The slit film tape composition of claim 22, wherein the propylene-based elastomer has a melt flow rate (ASTM D1238, 230° C., 2.16 kg) of 48 g/10 min.

24. The slit film tape composition of claim 22, wherein the propylene-based elastomer has a density (ASTM D1505) of 0.86 g/cm³ to 0.90 g/cm³.

25. The slit film tape composition of claim 22, wherein the propylene-based elastomer has a mm triad tacticity of at least 70%.

26. The slit film tape composition of claim 22, wherein the propylene-based elastomer has a peak melting point of less than 115° C.

27. The slit film tape composition of claim 22, wherein the propylene-based elastomer has a:
Shore hardness (ASTM D2240) of from 40 A to 80 A;
a tensile strength at break (ASTM D638) of from 5 MPa to 40 MPa; and
an elongation at break (ASTM D638) of from 1000% to 2500%.

28. The slit film tape composition of claim 22, wherein the propylene-based elastomer has:
a 1% secant flexural modulus at break (ASTM D790) of from 1 MPa to 100 MPa; and
a tear strength (die C) (ASTM D624) of from 1 N/mm to 50 N/mm.

29. The slit film tape composition of claim 22, wherein the filler comprises:
from 1 wt % to 99 wt % of a salt;
and a composition selected from the group consisting of a propylene elastomer, a polypropylene, and an ethylene-based polymer.

30. An article comprising the slit film tape composition of claim 22.

31. The slit film tape composition of claim 22, wherein the slit film tape composition has:
a tenacity (ASTM D882) of from 3 gpd to 6 gpd; and
a percent elongation (ASTM D882) of from 16% to 25%.

32. The slit film tape composition of claim 22, wherein the slit film tape composition has an ash % of 15% or less.

33. A slit film tape composition comprising:
a propylene-based elastomer comprising from 5 wt % to 30 wt % ethylene based on a total weight of the propylene-based elastomer, the propylene-based elastomer having:
a melt flow rate (ASTM D1238, 230° C., 2.16 kg) of from 35 g/10 min to 60 g/10 min, and
a peak melting point of less than 110° C.;
a polypropylene comprising from 10 mol % to 100 mol % propylene based on a total weight of the polypropylene, the polypropylene having a melt flow rate of from 2 g/10 min to 35 g/10 min (ASTM D1238, 230° C., 2.16 kg); and
a filler,
wherein the slit film tape composition has an ash % of 15% or less.

34. An article comprising the slit film tape composition of claim 33.

* * * * *